INVENTORS
ROBERT JEFFRIES,
ROBERT L. PROVENCAL
BY THEIR ATTORNEYS
HARRIS, KIECH, RUSSELL & KERN

INVENTORS
ROBERT JEFFRIES,
ROBERT L. PROVENCAL
BY THEIR ATTORNEYS
HARRIS, KIECH, RUSSELL & KERN

United States Patent Office 3,146,310

Patented Aug. 25, 1964

3,146,310

CONTROL APPARATUS FOR TELEPHONE ANSWERING SYSTEM

Robert Jeffries, 11272 Chapman Ave., Garden Grove, Calif., and Robert L. Provencal, 1605 S. Old Fashion Way, Anaheim, Calif.

Filed Aug. 15, 1960, Ser. No. 49,568

10 Claims. (Cl. 179—6)

This invention relates to control apparatus for operation remotely from telephone lines and is specifically described herein in conjunction with control apparatus for receiving and transmitting audio messages.

It is an object of the invention to provide control apparatus which can be used with existing telephone lines and central station equipment. A further object is to provide such apparatus which can be used in conjunction with or in place of the conventional handset. Another object is to provide such control apparatus which does not require any manual or mechanical manipulation of the handset.

It is an object of the invention to provide control apparatus which will automatically function as a message center without requiring local or remote supervision. A specific object is to provide apparatus which will record messages from incoming telephone calls and which will repeat the messages to the subscriber when he calls in, permitting interrogation from any remote location.

It is an object of the invention to provide a telephone control apparatus for controlling a device having first, second and third operating conditions with the device normally in the first condition, the apparatus including first and second telephone lines, first switch means actuated by a ringing signal on the first line, second switch means actuated by a ringing signal on a second line, means for maintaining the first switch means in the actuated condition until a call on the first line is terminated, means for maintaining the second switch means in the actuated condition until a call on the second line is terminated, means energized by the first switch when actuated for changing the device to the second condition, means energized by the second switch means when actuated for changing the device to the third condition, and third switch means actuated by the first and by the second switch means for switching each of the telephone lines to the in-use condition when either of the lines is in use. A further object is to provide such an apparatus for operation in conjunction with a record player and recorder with messages received on the first telephone line being recorded on the recorder for transmission on the second telephone line when the subscriber calls in. Another object is to provide another record player for use with such apparatus which will transmit a recorded message on the first line giving instructions to the caller for leaving a message.

It is an object of the invention to provide telephone control apparatus including a switching circuit actuated by a ringing signal on the telephone line and by an unlatch signal on the line, first means for producing an unlatch signal on the line, switch means actuated by the switching circuit for actuating the first means, and second means for de-actuating the switching circuit when a call on the line is terminated, with the switch means also providing the control for the recorder or other device being controlled. A further object is to provide such an apparatus wherein the switching circuit may be de-actuated by pulses or switching transients produced at the central station when a call is terminated. A further object is to provide such a circuit wherein the switching circuit may be de-actuated by signals generated at the control apparatus when a call is terminated. It is a specific object to provide such control apparatus including first and second switching circuits connected in series between the telephone line and the switch means which controls the recorder or other unit, with the second switch being directly actuated by a ringing signal on the line to operate the switch means and, among other functions, produce a handset unlatch signal on the telephone line for actuating the first switch and maintaining the second switch actuated, until the call is terminated.

The invention also comprises novel details of construction and novel combinations and arrangements of parts, together with other objects, advantages, features and results, which will more fully appear in the course of the following description. The drawings merely show and the description merely describes preferred embodiments of the present invention which are given by way of illustration or example.

Figure 1:
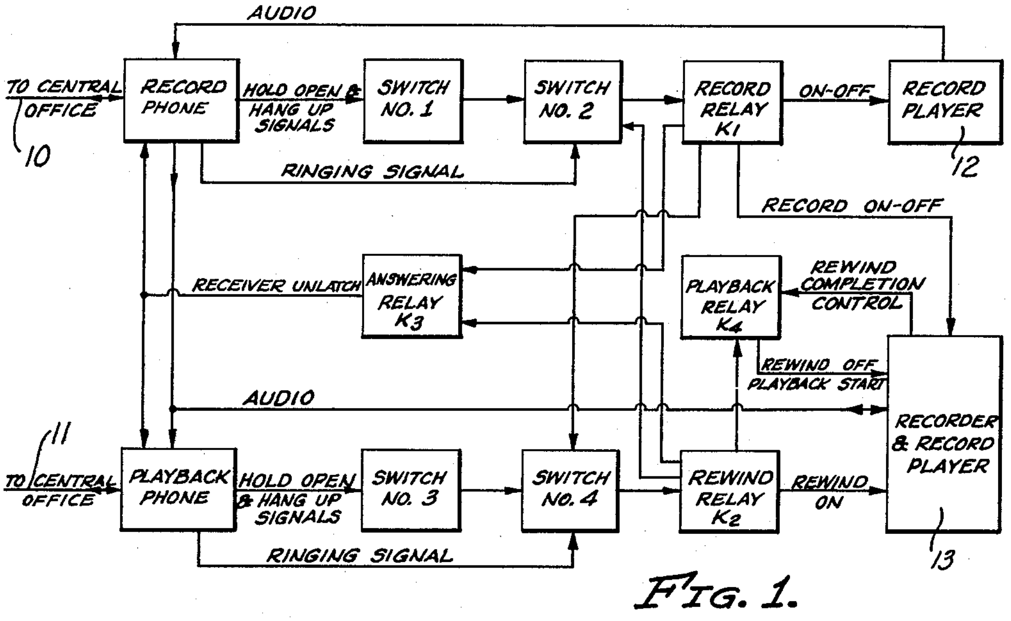
FIG. 1 is a block diagram of a preferred form of the control apparatus.

The preferred form of the invention shown in FIG. 1 utilizes two telephone lines 10, 11. The line 10 is connected to the record telephone and is the line on which calls are normally received. The line 11 is connected to the playback telephone and is used by the subscriber for interrogating the apparatus. Both telephones may be conventional subscriber's handsets. A ringing signal on the line 10 is directly coupled to switch No. 2 to actuate the switch, which in turn actuates the record relay K1. The record relay in turn actuates the answering relay K3 which unlatches the record phone, shutting off the ringing signal and closing the audio line. This operation simulates uncradling the telephone handset and produces an unlatch signal which actuates switch No. 1 which in turn biases switch No. 2 to hold it in the actuated condition and maintain the record relay K1 energized when the ringing signal terminates. This cycle of operation takes place during the first ring period.

The answering relay K3 also unlatches the playback telephone to provide a busy signal on the line 11 while the line 10 is in use, and the record relay K1 also disables switch No. 4 so that a ringing signal on the line 11 will not actuate the rewind relay K2.

When actuated, the record relay K1 also initiates an operating cycle of a record player 12 and switches a recorder 13 to the record mode. The record player repeats a short message to the caller through the record telephone, stating that the called party is not available and that the calling party may leave a message of any length. Then the record player automatically shuts itself off and the caller's message is recorded on the recorder 13. It should be noted that the record player 12 may be omitted in situations where the calling parties know that the record phone is unattended and that messages are to be recorded.

When the call is terminated by the calling party, a hang-up or termination signal is coupled to switch No. 1 to de-actuate switch No. 2 and the record relay, returning the apparatus to the normal condition ready to receive another call.

The subscriber or any other party knowing the number of the line 11 may call in on this line. The operation of the playback telephone, switch No. 3, switch No. 4, the rewind relay K2 and the answering relay K3 are the same as previously described in conjunction with the record telephone.

When the rewind relay K2 is actuated, the recorder 13, which ordinarily will be a tape recorder, is rewound or reset to the beginning of the record. When the rewind operation is completed, the playback relay K4 is actuated to switch the recorder to the playback condition so that the recorded messages will be transmitted to the line 11. If the line 11 is kept open by the caller, the recorder 13 will play back the entire length of the record, rewind, and continue to repeat this cycle. Ordinarily, the calling party on line 11 will permit the recorder to play back one cycle and rewind, after which the calling party will hang up to provide the entire length of record for subsequent calls, the previous message being erased in the normal manner as a new message is recorded. Alternatively, the calling party may hang up at the close of the last recorded message, leaving the messages on the record for subsequent use. When the calling party hangs up on line 11, the rewind relay K2 is de-actuated which in turn de-actuates the playback relay K4 and stops the record player.

Figure 4:
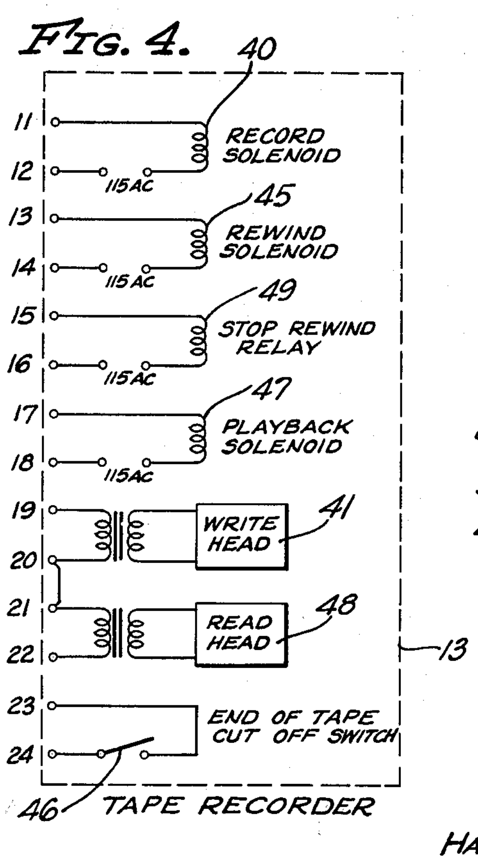
FIGS. 3 and 4 are schematics of components of the diagram of FIG. 2.
Figure 3:
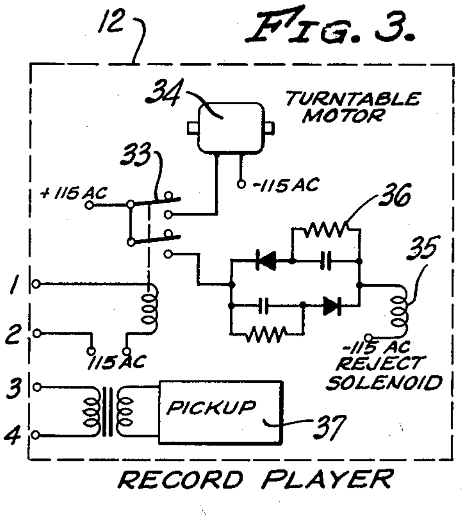
Figure 2:
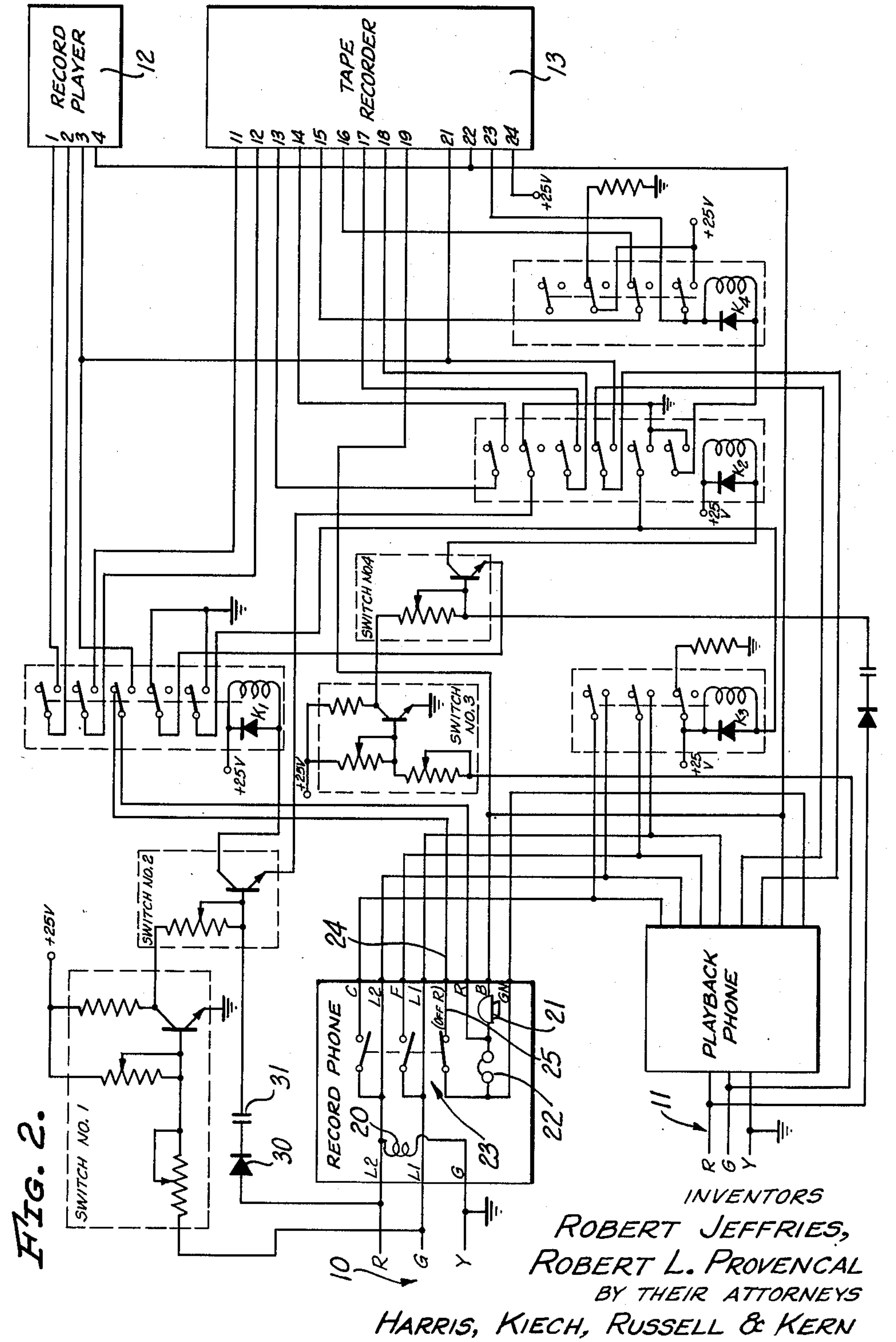
FIG. 2 is a detail schematic of the preferred embodiment.

A complete schematic for the apparatus of FIG. 1 is shown in FIG. 2. The switches Nos. 1, 2, 3 and 4 are transistor switching circuits. The relays K1, K2, K3, K4 are conventional mechanical relays, each with a diode rectifier connected in parallel with the coil to slow the release time of the relay and to prevent a high transient voltage from appearing across the coil and transistor. The relay contact sets will be designated herein by dash numbers counting upward from the coil. For example, the uppermost contact set of relay K1 will be identified as K1–5. The internal connections of the record players 12 and 13 are shown in FIGS. 3 and 4 respectively. The connection to the record telephone and the playback telephone are identical and only the former is shown. The wires of the apparatus are connected to specific terminals within the telephone as identified by the letters within the rectangle. The particular telephone used herewith is a Bell System 500D unit, but, of course, the apparatus of the invention is not limited to this particular telephone. The telephone includes a ringing coil 20, a microphone 21, a receiver 22, and a switch 23, the switch being actuated when the set is uncradled. The other internal connections of the telephone are not pertinent and are omitted for purposes of clarity. One modification is required inside the telephone. The wire 24 from relay set K1–3 is connected to the switch 23 through wire 25 which is removed from terminal R. The same arrangement is utilized in the playback phone.

The transisor switch No. 1 is biased in the conductive condition and the transistor of switch No. 2 is biased in the nonconductive condition. The transistor of switch No. 2 is connected in series with the coil of relay K1 and contact set K2–5 across the power supply. The ringing signal on the line 10 appears on the red conductor and is coupled to switch No. 2 through a rectifier 30 and capacitor 31 to provide a positive voltage for switching the transistor of switch No. 2 to the conductive state. Conduction through this transistor actuates the relay K1 if the relay K2 is not actuated. The relay K3 is then actuated through contacts at K1–1. Contact sets K1–3, K3–2, and K3–3 are actuated to simulate the actuation of the switch 23 of the record phone, corresponding to uncradling of the telephone handset.

When the record phone is unlatched, i.e., when the relay K3 is actuated, a negative voltage, with respect to ground, is produced on the green conductor of the line 10, which negative voltage is coupled to switch No. 1 and cuts off conduction of the transistor thereof. Unlatching the phone splits the line to ground, and the negative voltage appears from the central office. When the transistor of switch No. 1 is cut off, the positive bias on the transistor of switch No. 2 increases to maintain conduction after the ringing signal terminates. The sequence of actuating switch No. 2, relay K1, relay K3 and switch No. 1 occurs in one cycle of the ringing signal.

Closing of contacts at K1–5 on actuation of the record relay K1 energizes relay 33 in the record player 12 which couples power to the turntable motor 34 and to a reject solenoid 35 through a rectifier and RC delay network 36. Operation of the reject solenoid causes the pickup arm to be moved to the start of the record and the recorded message is transmitted from the pickup 37 through contact set K1–3 to the record telephone and the line 10. When the message from the record player 12 is completed, the record player may automatically turn itself off by interrupting the power to the relay 33 or the record player may continue to run with no audio signal.

Closing of contact set K1–4 energizes the record solenoid 40 of the recorder 13 for operating the recorder in the record mode. The write head 41 is connected to the line 10 through the relay KL and record phone for recording the caller's message.

After the calling party hangs up, the apparatus will be latched, i.e., cradling of the record phone will be simulated, to change switch No. 1 to the conductive state and switch No. 2 to the nonconductive state and de-energize the record relay K1 and the answering relay K3. In the particular embodiment shown herein, this latching is achieved by utilizing a voltage transient which appears on the line 10 about ten seconds after the calling party hangs up. A positive going pulse appears on the green conductor and changes switch No. 1 to the conductive state. This signal is inherent in the operation of certain types of central station equipment. As an alternative form of latching circuit, a signal generating unit can be added to the central station equipment to put a latching signal on the line after the calling party hangs up, the latching signal ordinarily being a pulse or a pulse train. In another alternative form of the apparatus, the latching control can be incorporated in the control apparatus at the subscriber's station. For example, a unit which produces a latching signal when the line 10 is open can be coupled to the line and to switch No. 1. Alternatively, a unit can be provided which detects audio signals on the line and generates the latching signal when the line has been free of audio signals for a predetermined period such as ten or fifteen seconds. Of course, the use of the inherent latching signal from the central station equipment is the least expensive and preferred form.

Following the latching operation, the apparatus is ready to receive another call on the line 10 or a call on the line 11. A call on line 11 actuates switch No. 3, switch No. 4, relay K2 and relay K3 in the same manner as described above in conjunction with a call on the line 10.

Closing of contact set K2–6 by actuation of the rewind relay K2 energizes the rewind solenoid 45 of the recorder 13, causing the recorder to start rewinding. When the starting end of the tape is reached, cutoff switch 46 is closed to actuate the playback relay K4 through the contact set K2–1. Opening of contact set K4–2 on actuation of the playback relay K4 de-energizes the stop rewind relay 49 of the recorder. Operation of the stop rewind relay terminates the rewind operation and starts the playback operation of the recorder, the playback solenoid 47 having been energized through contact set K2–4. The recorded message is transmitted through the read head 48 to the calling party on the line 11. It should be noted that the particular set of relays and solenoids for achieving rewind and playback of the recorder 13 is determined by the characteristics of the particular recorder used. The apparatus described herein is designed for use with a Wollensak Model T1600. Any recorder having rewind and playback modes may be utilized, it merely being necessary to adapt the rewind relay K2 for actuation of the appropriate control.

The recorder 13 will play back the entire length of the recording material, ordinarily a tape, then rewind and repeat the playback as long as the calling party stays on the line 11. When the calling party hangs up, the rewind relay K2 is de-energized stopping the recorder at that point. Hence, the calling party on the line 11 may control the point on the record at which a calling party on line 10 records a message. Ordinarily, the calling party on line 11 will hang up just after the recorder 13 has completed its rewind operation to provide a maximum amount of recording surface, the previous message being erased in the normal manner as a new message is recorded. Alternatively, the calling party on line 11 may wish to listen to all of the messages but keep the messages on the tape. This is most easily accomplished by noting the last message during the first playback cycle and then hanging up following this message during the second playback cycle.

It should be noted that in general, the control apparatus of the invention is used to unlatch and latch a telephone at a subscriber's station for receiving and transmitting messages or other signals. The actual telephone handset itself can be omitted as it is not used in the operation of the control apparatus, it merely being necessary that the control apparatus simulate the electrical characteristics of the handset as presented to the telephone line.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. In a telephone control apparatus for use with central station equipment which produces a voltage change on a telephone line when the line is loaded at the subscriber's end, the combination of: a first telephone line; a second telephone line; a first switch actuated by said voltage change on said first line; a second switch actuated by a ringing signal on said first line and by said first switch; a first record player having an audio output coupled to said first line; a second record player and recorder having an audio input coupled to said first line and an audio output coupled to said second line; a third switch for loading each of said lines; a fourth switch actuated by said second switch for actuating said third switch and said first record player; means for de-actuating said first switch when a call on said first line is terminated; a fifth switch actuated by said voltage change on said second line; a sixth switch actuated by a ringing signal on said second line and by said fifth switch; a seventh switch actuated by said sixth switch for actuating said third switch and resetting said second record player; an eighth switch actuated by said second record player when reset for converting to playback; and means for de-actuating said fifth switch when a call on said second line is terminated.

2. In a telephone control apparatus for use with central station equipment which produces a voltage change on a telephone line when the line is loaded at the subscriber's end, the combination of: a first telephone line; a second telephone line; a first switch actuated by said voltage change on said first line; a second switch actuated by a ringing signal on said first line and by said first switch; a record player and recorder having an audio input coupled to said first line and an audio output coupled to said second line; a third switch for loading each of said lines; a fourth switch actuated by said second switch for actuating said third switch and actuating said record player for recording; means for de-actuating said first switch when a call on said first line is terminated; a fifth switch actuated by said voltage change on said second line; a sixth switch actuated by a ringing signal on said second line and by said fifth switch; a seventh switch actuated by said sixth switch for actuating said third switch and resetting said record player; an eighth switch actuated by said record player when reset for converting to playback; and means for de-actuating said fifth switch when a call on said second line is terminated.

3. In an apparatus for controlling a device having first, second and third operating conditions, for use with central station equipment which produces a voltage change on a telephone line when the line is loaded at the subscriber's end, with the device normally in the first condition, the combination of: a first telephone line; a second telephone line; a first switch actuated by said voltage change on said first line; a second switch actuated by a ringing signal on said first line and by said first switch; a third switch for loading each of said lines; a fourth switch actuated by said second switch for actuating said third switch and changing the device to the second condition; means for de-actuating said first switch when a call on said first line is terminated; a fifth switch actuated by said voltage change on said second line; a sixth switch actuated by a ringing signal on said second line and by said fifth switch; a seventh switch actuated by said sixth switch for actuating said third switch and changing the device to the third condition; and means for de-actuating said fifth switch when a call on said second line is terminated.

4. In a telephone control apparatus for use with central station equipment which produces a voltage change on a telephone line when the line is loaded at the subscriber's end, the combination of: a telephone line; a first switch actuated by said voltage change on said line; a second switch actuated by a ringing signal on said line and by said first switch; a third switch for loading said line; a fourth switch actuated by said second switch for actuating said third switch and a device to be controlled; and means for de-actuating said first switch when a call on said line is terminated.

5. In a telephone control apparatus for use with central station equipment which produces a first voltage change on a telephone line when the line is loaded at the subscriber's end and a second voltage change when the calling party disconnects, the combination of: a telephone line; a first transistor switching circuit normally in the conductive state, said circuit being changed to the nonconductive state by said first voltage change on said line; a second transistor switching circuit normally in the nonconductive state, said circuit being changed to the conductive state by a ringing signal on said line and held in the conductive state by a bias signal produced by said first circuit when changed to the nonconductive state; switch means actuated by said second switching circuit when in the conductive state for loading said line and actuating a device to be controlled; and means for sensing said second voltage change on said line and changing said first switching circuit to the conductive state when a call on said line is terminated.

6. In a telephone control apparatus for use with central station equipment which produces a voltage change on a telephone line when the line is loaded at the subscriber's end, the combination of: a telephone line; a first transistor switching circuit normally in the conductive state, said circuit being changed to the nonconductive state by said voltage change on said line; a second transistor switching circuit normally in the nonconductive state, said circuit being changed to the conductive state by a ringing signal on said line and by said first circuit when changed to the nonconductive state; switch means actuated by said second switching circuit when in the conductive state for loading said line and actuating a device to be controlled; and means for coupling said first and second switching circuits to said line, with said first switching circuit being switched to the conductive state by a signal ocurring on said line when a call is terminated.

7. In a telephone control apparatus for use with central station equipment which produces a voltage change on a telephone line when the line is loaded at the subscriber's end, the combination of: a telephone line; a switching circuit actuated by a ringing signal and by said voltage change on said line; first means for loading said line; switch means actuated by said switching circuit for actuating said first means and a device to be controlled; and second means for de-actuating said switching circuit when a call on said line is terminated.

8. In a telephone control apparatus for use with central station equipment which produces a voltage change on a telephone line when the line is loaded at the subscriber's end, the combination of: a telephone line; a switching circuit actuated by a ringing signal and by said voltage change on said telephone line, and de-actuated by a switching transient on said telephone line when a call is terminated; an audio unit having an audio line coupled to said telephone line; first means for loading said telephone line; and switch means actuated by said switching circuit for actuating said first means and said audio unit.

9. In a telephone control apparatus for use with central station equipment which produces a first voltage change on a telephone line when the line is loaded at the subscriber's end and a second voltage change when the calling party disconnects, the combination of:

a first telephone line;
a second telephone line;
a first switch actuated by said first voltage change on said first line;
a second switch actuated by a ringing signal on said first line and by said first switch;
a record player and recorder having an audio input coupled to said first line and an audio output coupled to said second line;
a third switch for loading each of said lines;
a fourth switch actuated by said second switch for actuating said third switch and actuating said record player for recording;
means for sensing said second voltage change on said first line and de-actuating said first switch when a call on said first line is terminated;
a fifth switch actuated by said first voltage change on said second line;
a sixth switch actuated by a ringing signal on said second line and by said fifth switch;
a seventh switch actuated by said sixth switch for actuating said third switch and resetting said record player;
an eighth switch actuated by said record player when reset for converting to playback;
and means for sensing said second voltage change on said second line and de-actuating said fifth switch when a call on said second line is terminated.

10. In a telephone control apparatus for use with central station equipment which produces a voltage change on a telephone line when the line is loaded at the subscriber's end, the combination of:

a first telephone line;
a second telephone line;
a first switching circuit actuated by a ringing signal on said first line and by said voltage change on said first line;
a record player and recorder having an audio input coupled to said first line and an audio output coupled to said second line;
means for loading each of said lines;
first switch means actuated by said first switching circuit for actuating said loading means and turning said record player on in the record condition;
means for de-actuating said first switching circuit and turning said record player off when a call on said first line is terminated;
a second switching circuit actuated by a ringing signal on said second line and by said voltage change on said second line;
second switch means actuated by said second switching circuit for actuating said loading means and turning said recorder on in the playback condition, said recorder including control means for continuously playing through the record and resetting to the beginning when in the playback condition;
and means for de-actuating said second switching circuit and resetting said recorder to the record condition at the location being played when a call on said second line is terminated.

References Cited in the file of this patent

UNITED STATES PATENTS

| | | |
|---|---|---|
| 2,221,883 | Rowe | Nov. 19, 1940 |
| 2,228,673 | Reeves | Jan. 14, 1941 |
| 2,743,315 | Van Deventer et al. | Apr. 24, 1956 |
| 2,778,876 | Gordon | Jan. 22, 1957 |